United States Patent [19]

Duncan

[11] 4,116,015
[45] Sep. 26, 1978

[54] METHOD AND APPARATUS FOR REMOTELY ATTACHING A RISER PIPE TO AN OFFSHORE STRUCTURE

[75] Inventor: Anthony Bruce Duncan, Missouri City, Tex.

[73] Assignee: HydroTech International, Inc., Houston, Tex.

[21] Appl. No.: 755,474

[22] Filed: Jan. 3, 1977

[51] Int. Cl.² .................................................. F16L 41/00
[52] U.S. Cl. ................................ 405/169; 24/249 LS; 81/57.2; 81/57.3; 269/239
[58] Field of Search ................ 61/110, 111, 109, 107, 61/108, 69 R, 113, 86; 24/249 LS; 81/57.2, 57.33; 269/239

[56] References Cited

U.S. PATENT DOCUMENTS

| 2,985,455 | 5/1971 | Powell | 81/57.2 X |
| 3,557,564 | 1/1971 | Hauber | 61/110 |
| 3,799,010 | 3/1974 | Guier | 81/57.33 X |
| 4,014,180 | 3/1977 | Kelly et al. | 61/110 |

FOREIGN PATENT DOCUMENTS 625,728  9/1961  Italy .......................................... 61/109

Primary Examiner—Jacob Shapiro
Attorney, Agent, or Firm—James A. Bargfrede

[57] ABSTRACT

A method and apparatus for attaching by remote control a riser pipe to an offshore structure. The method includes installing one or more remotely operable pre-aligned jawed clamps upon the structure, suspending the riser pipe vertically over the side of the structure, guiding the pipe to a position between the open jaws of the clamps, and remotely closing the jaws about the riser pipe. The apparatus includes an arcuate seat rigidly attachable to the structure, a pair of arcuate jaws hingedly attached to the seat, and remotely controlled hydraulic piston and cylinder assemblies to move the jaws between an open position to receive the pipe and a closed position to hold the pipe.

2 Claims, 4 Drawing Figures

METHOD AND APPARATUS FOR REMOTELY ATTACHING A RISER PIPE TO AN OFFSHORE STRUCTURE

BACKGROUND OF THE INVENTION a. Field of the Invention

This invention relates to a method and apparatus for attaching by remote control a riser pipe to an offshore structure.

b. Description of the Prior Art

Offshore petroleum production systems are comprised primarily of offshore structures having storage or transportation facilities connected by pipelines laid along the sea bottom. The structures provide surface work areas, and are in the form of platforms built up from the sea bottom to the surface. The surface work areas and the underwater pipelines are connected by vertically extending pipes known as riser pipes.

Presently, riser pipes are attached to platforms manually by divers. The riser pipe is suspended in the water by a crane or the like and then positioned and fixed in place by means of bands or straps. This procedure requires a considerable amount of diver-time and is dangerous to the divers.

SUMMARY OF THE INVENTION

It is therefore an object of this invention to provide an improved method and apparatus that may be used to attach riser pipes to offshore structures by remote control thereby minimizing the use of divers.

Briefly stated, the method of the present invention contemplates installing one or more remotely operable clamps upon the structure. The clamps are comprised generally of means for holding the riser pipe, means for opening and closing the holding means about the riser pipe and means for mounting the holding means to the structure. The holding means take the form of an arcuate seat and a pair of arcuate jaws hingedly joined to the seat for movement between an open position to receive the riser and a closed position to hold the riser. The opening and closing means include hydraulic cylinder and piston assemblies. The mounting means includes a cylindrical pedestal.

The clamps are installed upon the side of the offshore structure during construction and are aligned in the intended direction that the riser pipe will run. After the structure has been erected at its offshore site, the jaws of the clamps are powered to the open position. The riser pipe is then suspended in the water and guided to a position between the open jaws. When the riser pipe is between the jaws, the jaws are remotely powered to close about the pipe with a predetermined and variable clamping pressure. If the pipe is not properly positioned after the jaws are closed, the jaws may be reopened slightly to allow for repositioning. When the pipe is properly positioned, the jaws may be locked about the pipe with mechanical fasteners to maintain the preselected clamping pressure so that the pressure in the hydraulic system may be relieved.

DESCRIPTION OF THE PREFERRED EMBODIMENT

Figure 1:
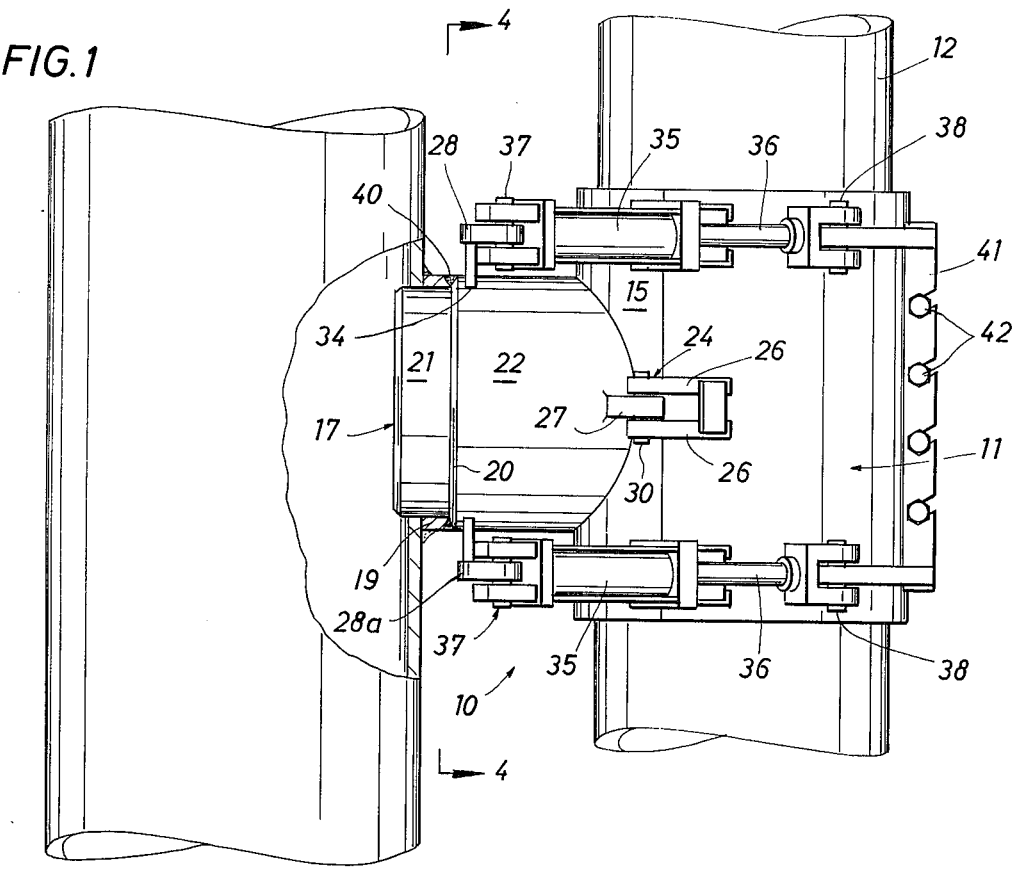
FIG. 1 is a side elevation view of one clamp of the present invention shown in the closed position about a riser pipe.

Referring now to the drawings, the clamp of the present invention, designated generally by the numeral 10, is generally comprised of means for holding the riser pipe 12, means for opening and closing the holding means about riser pipe 12, and means for mounting the holding means to offshore structure 18. Pipe 12 may have a weight coating 12a or the like applied thereto.

Figure 3:
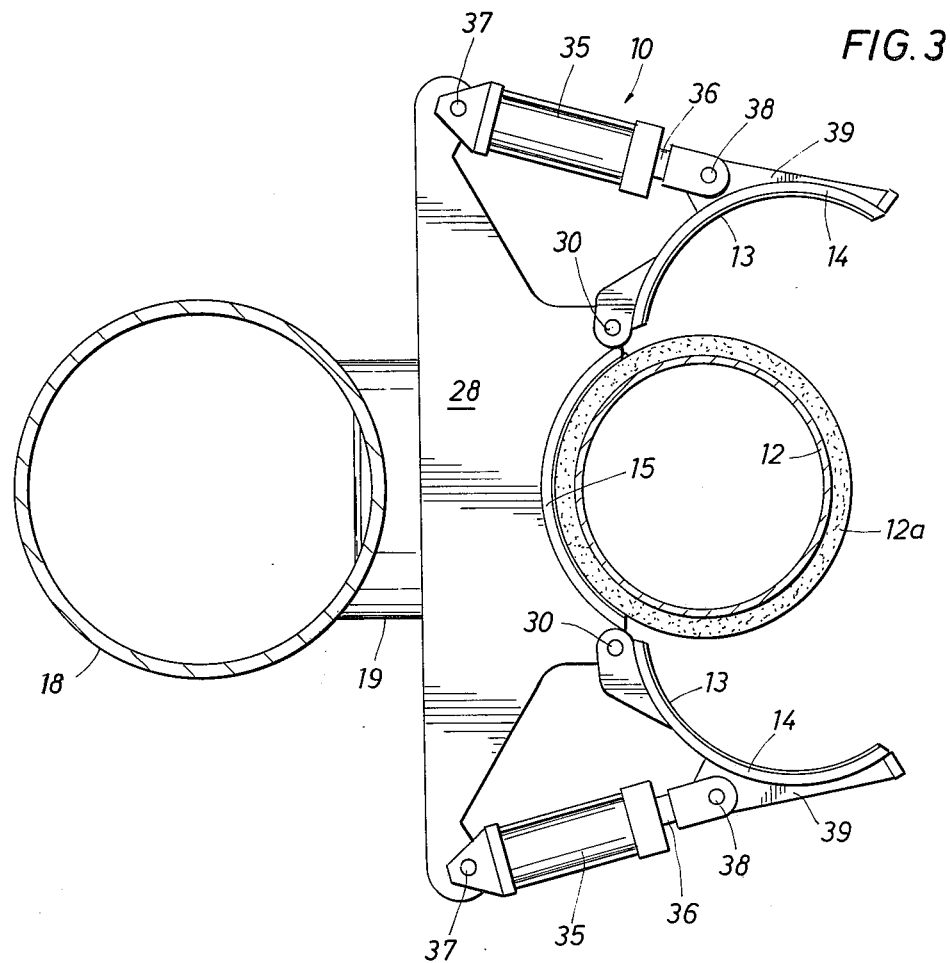
FIG. 3 is a top elevation view showing the clamp in the open position.
Figure 4:
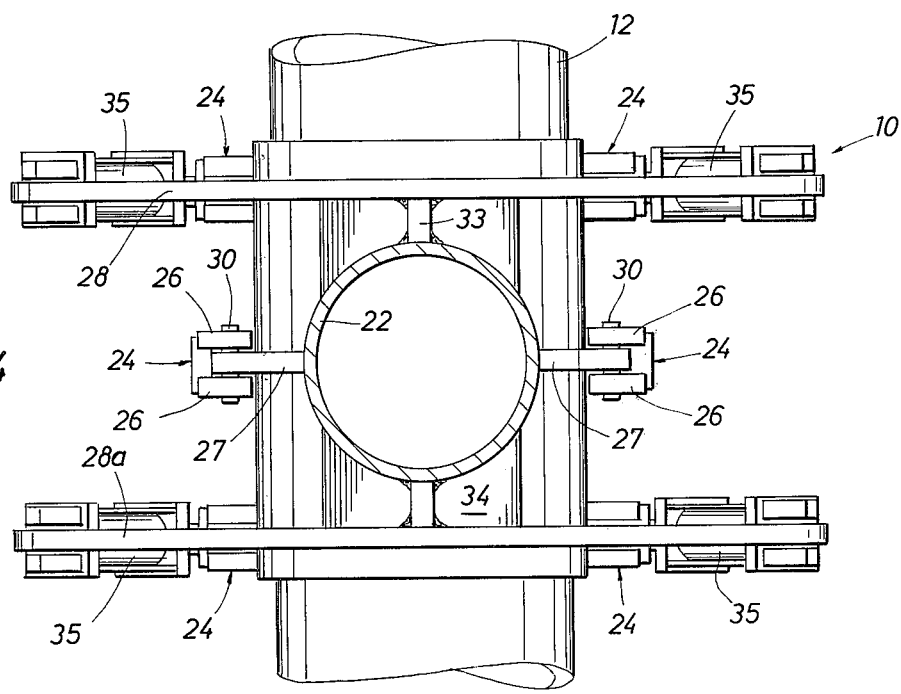
FIG. 4 is a back elevation view taken generally along line 4—4 of FIG. 1.

The holding means is in the form of a tubular cylinder 11 having an inside diameter substantially equal to the outside diameter of riser pipe 12 (including coating 12a). The inside surface of a cylinder 11 is provided with a liner 13, as best seen in FIG. 3. Liner 13 is formed of a layer of an elastomeric material such as nitrile, and functions to provide uniform frictional restraint to riser pipe 12 by conforming to any irregularity in the surface of coating 12a. Liner 13 may be slotted longitudinally or may be applied in spaced apart longitudinal strips to facilitate intrusion thereof into surface irregularities of coating 12a as pressure is applied to riser pipe 12 by clamp 10.

Figure 2:
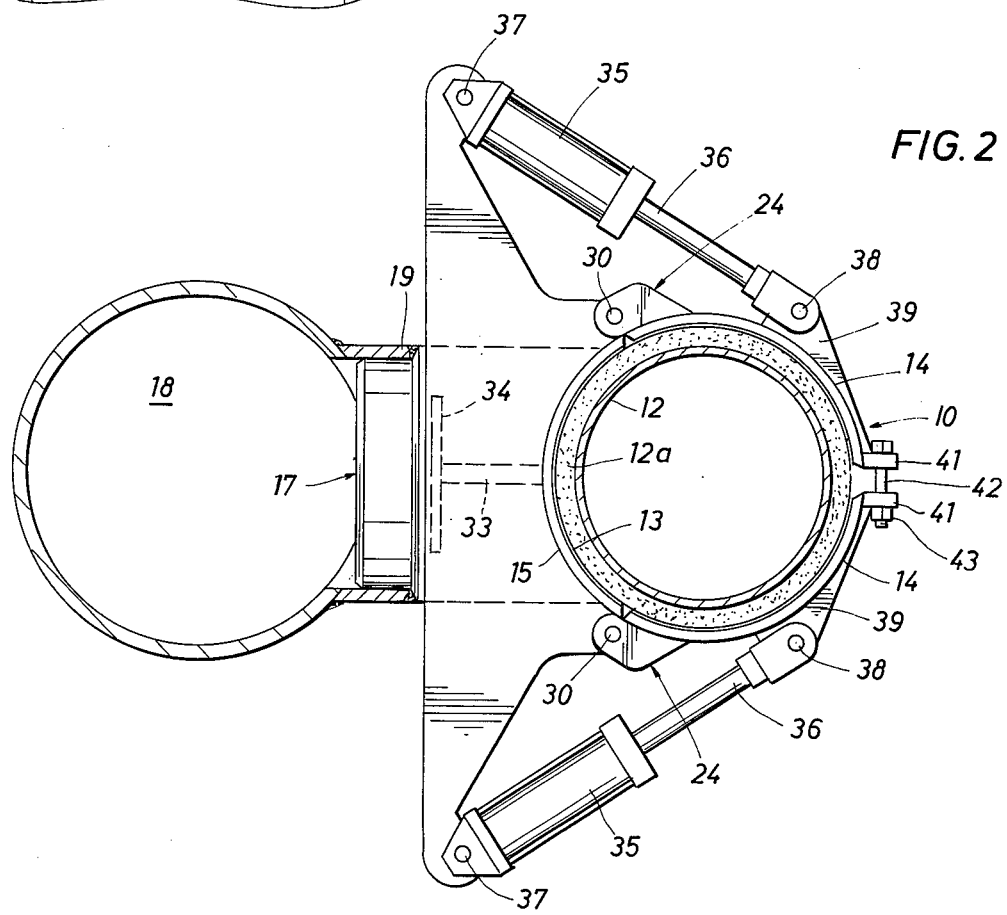
FIG. 2 is a top elevation view showing the clamp in the closed position.

Cylinder 11 is divided longitudinally into three sections of approximately equal arc length. Two of the sections are jaws 14—14. The other section is designated as seat 15. Jaws 14 are articulatedly connected to seat 15 to be movable between an open position to receive riser pipe 12, as shown in FIG. 3, and a closed position to restrain riser pipe 12 against lateral forces, as best shown in FIG. 2. Jaws 14 are of an arc length less than is required to completely encircle riser pipe 12, thus leaving a gap as shown in FIG. 2, when jaws 14 are closed. The gap allows for accommodation of unexpectedly reduced outside diameters of coating 12a and for some over travel of jaws 14. The details of the means for joining jaws 14 to seat 15 and for closing jaws 14 about the riser pipe 12 will be described later.

Cylinder 11 is mounted upon pedestal 17 which is joined to seat 15 as by welding or the like. Pedestal 17 is in turn joined to structure 18 by means of a cylindrical pilot collar 19. Pedestal 17 is comprised of a first cylindrical member 22 having an outside diameter approximately equal to that of collar 19 and a second cylindrical member 21 having an outside diameter approximately equal to the inside diameter of collar 19. The junction of first cylindrical member 22 and second cylindrical member 21 is in the form of a shoulder 20 having a width approximately equal to the radial thickness of collar 19. The terminal end 23 of second cylindrical member 21 is beveled to facilitate the insertion thereof into collar 19 and engagement with shoulder 20.

The articulation of each jaw relative to seat 15 is accomplished by means of three hinges 24 attached to each side of seat 15. Hinges 24 are substantially equally spaced along the rearward end of each jaw 14 and each is comprised of a pair of parallel hinge members 26 spaced apart to accommodate a lug therebetween. Lugs 27 for the center hinges 24 are attached by welding or the like to member 22. Lugs 27 also serve as braces to strengthen the connection between seat 15 and pedestal 17. Upper hinges 24 are formed with and connected to an upper plate 28 and lower hinges 24 are formed with and connected to a lower plate 28a. Each hinge member 26 and accompanying lug has a hole therethrough to accommodate a hinge pin 30.

Plates 28 and 28a, referred to above, serve both to provide points of attachment for upper and lower hinges 24 and for the closing means (to be described below) and to provide additional strength to the connection of seat 15 to pedestal 17. Plates 28 and 28a are generally trapezoidal in shape and have relatively narrow forward edges and broad rearward edges. The central portion of the forward edges of plates 28 and 28a are cut out to fit seat 15, and the outboard corners thereof form lugs for upper and lower hinges 24. The outboard corners of the rearward edges of plates 28 and 28a form lugs for the attachment of the closing means.

Lug plates 28 and 28a are disposed in parallel planes on opposite sides of pedestal 17. Lug plates 28 and 28a are attached to seat 15 by welding or the like, and to member 22 by means of gussets 33 and braces 34.

The means for closing jaws 14 about riser pipe 12 include four hydraulic cylinder and piston assemblies, each of which is designated by the numeral 35, and one pair of which is disposed on each side of clamp 10. The rearward ends of the upper hydraulic cylinder and piston assemblies 35 are hinged by pins 37 to plate 28, and the rearward ends of the lower ones are hinged by pins 37 to plate 28a. The rod end 36 of each assembly 35 is attached by a pin 38 to a lug 39 which is attached by welding or the like to a jaw 14. Hydraulic cylinder and piston assemblies 35 are actuated remotely by a system of hydraulic lines (not shown). The hydraulic lines are attached in such a way that hydraulic cylinder and piston assemblies 35 may be remotely powered to the extended position, as shown in FIG. 2, and the retracted position, as shown in FIG. 3.

To install clamp 10 upon structure 18, collar 19 is welded to a segment thereof. After collar 19 has been welded to structure 18, that part of structure 18 enclosed by collar 19 is cut out, leaving a hole to accommodate member 21 of pedestal 17. Member 21 is then inserted into collar 19 so that shoulder 20 abuts the end of collar 19. After insertion of member 21, the mounting is completed by making a circumferential weld 40 around the junction of member 22 and collar 19.

To mount riser pipe 12 upon structure 18, one or more clamps 10 are installed as aforesaid along the intended route of the pipe. After mounting, hydraulic cylinder and piston assemblies 35 are powered to the retracted position, thereby opening jaws 14 to receive riser pipe 12. Riser pipe 12 is then suspended from the offshore platform by a crane or the like and is guided between the jaws 14 of clamps 10. When riser pipe 12 is between jaws 14, hydraulic cylinder and piston assemblies 35 are extended, thereby driving jaws 14 closed about the pipe. The force exerted by jaws 14 is sufficient to overcome any opposing wave forces or residual forces caused by structural misalignment. Jaws 14 may be opened slightly to allow for adjustment of the position of riser pipe 12.

After riser pipe 12 is properly in position, clamp 10 is loaded to the preselected pressure and then locked into position by bolting jaws 14 together. To facilitate bolting, each jaw 14 is provided with a bolt bar 41 braced by a pair of lugs 39. Each bolt bar 41 is provided with a plurality of bolt slots 44, so aligned that bolts 42 may be inserted therein. When jaws 14 are loaded to the preselected pressure, a diver inserts bolts 42 with nuts 43 threaded thereon into slots 44 and hand tightens nuts 43. After all bolts 42 have been so inserted, the pressure in the hydrualic system is relieved, thereby allowing compressed liner 13 to expand until the expansive force thereof is balanced by the tension of bolts 42 and nuts 43.

Modification and alternative embodiments of the method and apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of the disclosure of this description of the invention.

What is claimed is:

1. In apparatus for attaching a riser pipe to an offshore structure, the combination comprising:
   an arcuate seat having a radius of curvature substantially equal to that of said pipe;
   means for rigidly mounting said seat to said structure;
   a pair of arcuate jaws each having a radius of curvature substantially equal to that of said pipe hingedly attached to said arcuate seat for movement between an open position to receive said pipe and a closed position to hold said pipe to said structure;
   power means for moving said arcuate jaws between said open position and said closed position;
   and locking means for locking said arcuate jaws in said closed position.

2. In apparatus for attaching a riser pipe to an offshore structure, the combination comprising:
   an arcuate seat having a radius of curvature substantially equal to that of said pipe;
   means for rigidly mounting said seat to said structure;
   a pair of arcuate jaws each having a radius of curvature substantially equal to that of said pipe hingedly attached to said arcuate seat for movement between an open position to receive said pipe and a closed position to hold said pipe to said structure;
   power means for moving said arcuate jaws between said open position and said closed position;
   and locking means for locking said arcuate jaws in said closed position, said locking means comprising a pair of bolt bars, one of which is attached to each of said arcuate jaws such that when said arcuate jaws are in said closed position, said bolt bars are substantially adjacent to each other, said bolt bars having a plurality of bolt slots into which bolts with nuts threaded thereon may be inserted to join said bolt bars together.

* * * * *